C. O. HAWKSLEY AND W. J. BAUMANN.
SAW TOOTH GAGE.
APPLICATION FILED JULY 14, 1920.
1,378,409.
Patented May 17, 1921.
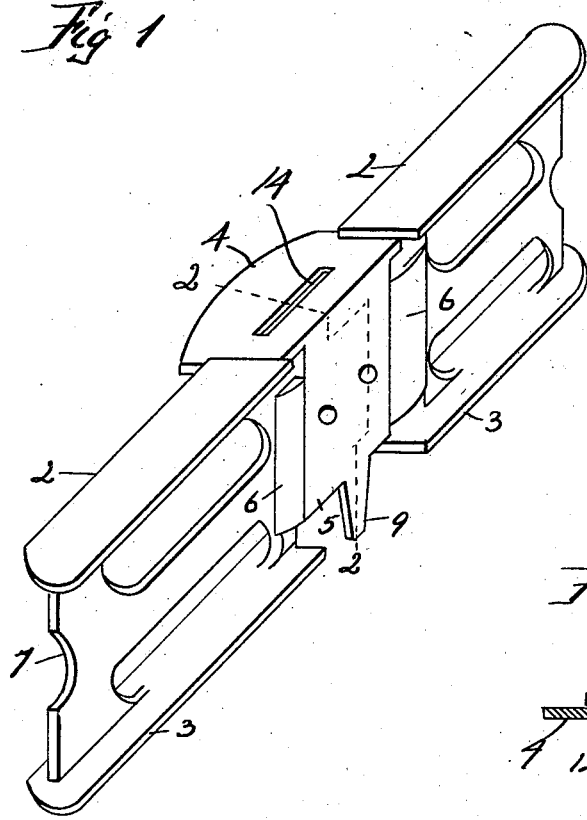
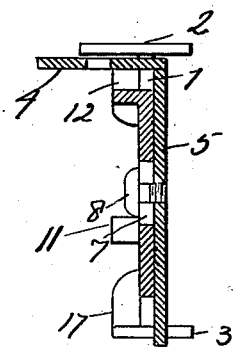
Inventors
Coleman O. Hawksley
William Baumann
By W. W. Williamson
Atty.

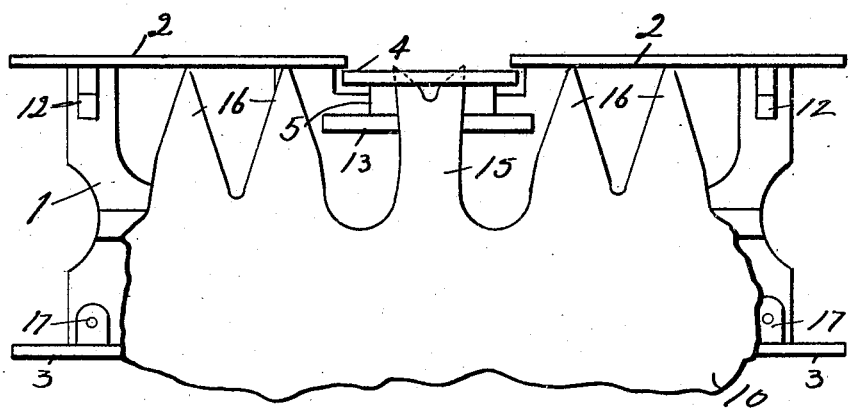
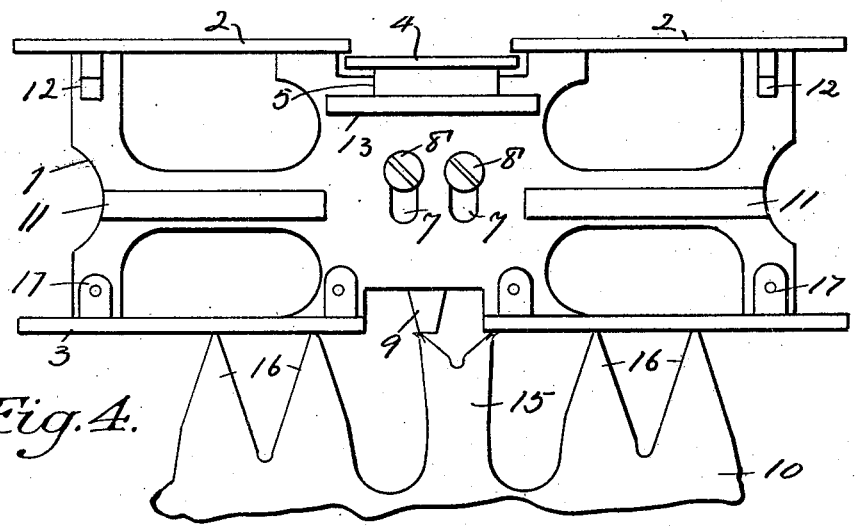

UNITED STATES PATENT OFFICE.

COLEMAN O. HAWKSLEY AND WILLIAM J. BAUMANN, OF PHILADELPHIA, PENNSYLVANIA.

SAW-TOOTH GAGE.

1,378,409.      Specification of Letters Patent.      Patented May 17, 1921.

Application filed July 14, 1920. Serial No. 396,190.

*To all whom it may concern:*

Be it known that we, COLEMAN O. HAWKSLEY and WILLIAM J. BAUMANN, citizens of the United States, residing at Philadelphia, in the county of Philadelphia and State of Pennsylvania, have invented new and useful Improvements in Saw-Tooth Gages, of which the following is a specification.

Our invention relates to a new and useful improvement in saw tooth gages, and is especially adapted for gaging the raker teeth of a cross cut saw, and has for its object to provide a simple and effective gage of this description which by one setting the raker teeth of a cross cut saw may be filed to the exact desired length prior to swaging or turning the edges thereof outward longitudinally of the saw and also gaging said teeth after the filing operation to bring them to the exact predetermined length after swaging.

A further object of our invention is to provide a hardened plate through which the raker teeth of a saw may project while being filed and also to provide guides for preventing the file during the operation of filing the raker teeth from undue sidewise movement.

With these ends in view, this invention consists in the details of construction and combination of elements hereinafter set forth and then specifically designated by the claims.

In order that those skilled in the art to which this invention appertains, may understand how to make and use the same, we will describe its construction in detail, referring by numerals to the accompanying drawings forming a part of this application, in which:—

Figure 1, is a perspective of a gage made in acccordance with our improvement.

Fig. 2, is a section on the line 2—2 of Fig. 1.

Fig. 3, is a side elevation of the gage showing a portion of a cross cut saw in position thereon for filing and gaging the raker teeth.

Fig. 4, is a view similar to Fig. 3, showing the gage applied to the raker tooth of a cross cut saw when determining the length of the raker teeth after it has been swaged.

In carrying out our invention as here embodied, 1 represents the web or central member of the gage to which is secured in any suitable manner the top plates 2 the inner ends of which are spaced apart a sufficient width to permit the passage of a file therebetween, for the purpose hereinafter set forth. This web or central member also has secured thereto in any suitable manner the two bottom plates 3 the inner ends of which are likewise spaced apart for the purpose which will hereafter appear.

4 represents the gage plate having formed therewith or secured thereto the supporting slide 5 which is fitted to slide between the ribs 6, said ribs being formed with or secured to the web or central member.

Through the central portion of the web are formed two slots 7 through which these clamping screws 8 pass, said screws threading into the supporting slide 5 thereby providing for the vertical adjustment of said slide and consequently the gage plate 4. Upon the opposite end of the vertical slide is formed a gage prong 9 which projects downward between the bottom plates 3 and serves as the second or final gage by which the length of the raker teeth is determined.

From the foregoing description the operation of our improvement will be obviously as follows:—

When the raker teeth of a saw 10 are to be trued and gaged the saw is placed against one face of the web or central member, said plates having formed therewith the ribs 11, 12 and 13 for properly positioning the saw relative to the slot 14 which is formed in the gage plate 4 so that one of the raker teeth 15 projects through said slot. When the raker teeth are in this position upon the gage as clearly shown in Fig. 3 their projecting edges may be readily filed flush with the gage plate, the inner ends of the top plates 2 serving as a guide to guide the file during this operation. When the raker teeth have been thus filed it is necessary to set their edges outward longitudinally of the saw blade and this is done by swaging the extreme ends of said teeth to give the proper incline, and to determine the amount of this swaging the gage is reversed and the plates 3 brought in contact with the ends of the cutting teeth 16 of the saw when the prong 9 is utilized to gage the height of the swaged edges of the raker teeth relative to the length of the cutting teeth 16.

As the gage plate 4 and gage prong 9 are to all intents and purposes one piece the adjustment of the supporting slide 5 adjusts both the gage plate and the gage prong 9 simultaneously so that there is no possibility of displacement between the gage plate and the gage prong, thus making the instrument highly accurate and efficient.

While our improved gage may be made in any desired manner we prefer that the web or central member shall be an aluminum casting and that the plates 2 and 3 shall be attached thereto by the lugs 17, said plates being of hardened steel in order that the contact of the teeth of the saw therewith may not mar said plates or wear them out of true.

Of course we do not wish to be limited to the exact details of construction as herein shown as these may be varied within the limits of the appended claims without departing from the spirit of our invention.

Having thus fully described our invention, what we claim as new and useful is:—

1. In a gage for the raker teeth of a cross cut saw, the combination of a web, two top plates secured to said web, the inner edges of said plates being spaced apart to form an access opening, two bottom plates also secured to said web their inner edges being spaced apart, a sliding support adjustably secured to the web, a slotted gage plate carried by one end of said support, and a gage prong carried by the other end of said support.

2. In a gage for the raker teeth of a cross cut saw, the combination of a web, two top plates secured to said web, the inner edges of said plates being spaced apart to form an access opening, two bottom plates also secured to said web their inner edges being spaced apart, a sliding support adjustably secured to the web, a slotted gage plate carried by one end of said support, and ribs formed upon one face of the web for contacting with the face of the saw to properly locate the raker teeth relative to the slot in said gage plate.

3. In a device of the character described, a web, guide ribs formed upon one face of said web, a sliding support fitted to move between said guide ribs to permit of adjustment relative to said web, means for holding said sliding support in any adjustment, a slotted gage plate carried by one end of the sliding support, a gage prong carried by the opposite end of said sliding support, two top plates secured to the web their inner ends being spaced apart so as to give access to the gage plate and serve as a guide for a file, two bottom plates also secured to the web their inner edges being spaced apart so as to give access to the gage prong and positioning the ribs formed upon one face of the web for contacting with the face of the saw.

4. In a device of the character described, a web having guide ribs formed upon one face thereof and positioning ribs formed upon the opposite face thereof, two pairs of plates, each pair being secured to the opposite edges of said ribs, the inner edges of said plates being spaced apart to form access openings, a support adapted to slide between the guide ribs, a slotted gage plate rigidly mounted upon one end of the support, a gage prong rigidly mounted upon the opposite end of said support, and means for adjusting the support in various positions upon the web.

In testimony whereof we have hereunto affixed our signatures.

COLEMAN O. HAWKSLEY.
WILLIAM J. BAUMANN.